UNITED STATES PATENT OFFICE 2,463,096

WELDING ELECTRODE

Francis E. Garriott, West Allis, Wis., assignor to Ampco Metal, Inc., Milwaukee, Wis., a corporation of Wisconsin No Drawing. Application March 1, 1946,
Serial No. 651,379

3 Claims. (Cl. 219—8)

This invention relates to bronze welding electrodes, and may be applied generally to the construction of welding electrodes of copper and copper base alloys.

The principal object of the invention is to provide a covered welding electrode of copper or copper base alloy such as bronze and which has good A. C. (alternating current) characteristics as well as good D. C. (direct current) characteristics, both straight and reverse polarity.

Another object of the invention is to accomplish the above purpose and at the same time provide an electrode that will produce a sound deposit free from blow holes and surface pits.

Another object of the invention is to provide a covering for a bronze welding electrode that greatly enlarges the scope of usefulness of the electrode and makes it adaptable for many purposes.

Another object is to provide a covering which may be applied to bronze electrodes of compositions heretofore difficult to weld with, such as Phosphor bronze, and which will make it possible to employ almost any bronze composition for welding.

Another object is to increase the electrical resistance of the arc and thereby provide a more effective arc with greater energy consumption.

According to the invention a covering of sodium fluoride and cryolite, such as that disclosed in the United States Patent No. 2,238,392 issued April 15, 1941, to Milan A. Matush, is diluted to substantially reduce the percentage of fluorides and a thicker covering is provided having ingredients which greatly improve the arc stability, the A. C. characteristics, the density of the deposit and the quality of the weld.

The invention is based upon the discovery that by reducing the fluoride content and adding in place thereof certain potassium compounds such as potassium silicate and feldspar together with iron the A. C. characteristics of the weld rod can be greatly improved, and that the density of the deposit and its smoothness can be greatly improved by providing along with the pure iron a limited amount of iron oxide. It has also been discovered that the addition of barium carbonate to a bronze rod coating of this type provides a slag having a lower surface tension and providing a better and unbroken coverage of the weld.

The exact composition may be varied considerably and different bronzes may make it desirable to change the composition or add other ingredients thereto.

A suitable composition for use on a Phosphor bronze electrode and which is also suitable for most aluminum bronzes is as follows:

| | Parts |
|---|---|
| Sodium silicate | 52 |
| Potassium silicate | 136 |
| Sodium fluoride | 30 |
| Cryolite | 30 |
| Magnetite (Fe$_3$O$_4$) | 74 |
| Iron powder | 60 |
| Barium carbonate | 74 |
| Carbon | 30 |

In the above composition parts are given by weight and the total iron content of the final covering by analysis is about 30% by weight. The iron appears to increase the resistance of the arc providing for greater energy consumption therein and a more effective arc for a given arc length. A shorter arc may be employed with the present electrode thereby reducing the danger of oxidation of the metal passing through the arc.

The iron may be provided in the form of iron powder or of various ferrous compounds such as ferro-chromium, ferro-molybdenum, ferro-vanadium, ferro-silicon, and the like provided the total iron content is kept generally comparable. The total iron content to be employed will depend upon the type of bronze for the electrode core and upon the composition of the covering. In general the iron content of the covering by analysis may vary from about 5% to about 50%.

For aluminum bronze rods ferro-chromium has been found to give a smoother appearing deposit.

The iron oxide may be provided in any suitable form, both magnetite and hematite being relatively low cost forms on the market.

The addition of about 50 parts of feldspar to the above composition makes the slag easier to remove.

It has been found that both iron and iron oxide should be employed. Pure iron alone with the other ingredients provides a rod with good A. C. characteristics but with a tendency to produce blowholes, whereas magnetite alone with the other ingredients provides a rod giving dense deposits but having poorer A. C. characteristics.

A mixture of the iron and iron oxide has been found most satisfactory since when both iron and iron oxide are employed in the covering the electrode has excellent A. C. characteristics and also produces a dense deposit free from blowholes.

It is possible to substitute feldspar for the potassium silicate although too much feldspar tends to unduly increase the arc penetration unless an added amount of iron is provided.

The barium carbonate is added to provide better slag coverage for the weld. The carbon may be in the form of either pure carbon or a suitable carbon compound such as carbohydrate. It tends to provide a reducing atmosphere for the arc and to protect the metal passing through the arc from oxidation.

The sodium silicate serves principally as a binder. Potassium silicate, 40° Baumé may be used in place of sodium silicate as the binder.

The electrode produces a sound weld deposit free from blowholes and surface pits and is adapted for both A. C. and D. C. welding.

The covering has a higher melting point than that of the patents referred to and produces a crater sleeve at the arcing end of the electrode to assist in directing the metal being deposited to thereby obtain a greater efficiency of deposit.

The covering may be applied either by extrusion or by dipping. In general, the thicker the covering the easier it is to remove the slag resulting after welding.

Various embodiments of the invention may be provided within the scope of the accompanying claims.

I claim:

1. A bronze electrode for metallic arc welding and deposition, consisting of a bronze core rod and a covering therefor, said covering comprising a mixture of fluoride slag producing materials, a silicate binder, iron and potassium, the iron being in the form of powdered iron and iron oxide, and the potassium being in the form of feldspar and of potassium silicate which constitutes at least a part of the binder, and the iron constituting from 5% to 50% of the total weight of the covering.

2. A bronze electrode for metallic arc welding and deposition, consisting of a bronze core rod and a covering therefor, said covering comprising a mixture of fluoride slag producing materials, a silicate binder, barium carbonate, iron and potassium, the iron being in the form of powdered iron and iron oxide, and the potassium being in the form of feldspar and of potassium silicate which constitutes at least a part of the binder, and the iron constituting from 5% to 50% of the total weight of the covering.

3. A bronze electrode for metallic arc welding and deposition having a covering consisting of an initial mixture applied thereto comprising the following ingredients substantially in the proportions given in parts by weight:

| Ingredient | Parts |
|---|---|
| Sodium silicate | 52 |
| Potassium silicate | 136 |
| Sodium fluoride | 30 |
| Cryolite | 30 |
| Magnetite ($Fe_3O_4$) | 74 |
| Iron powder | 60 |
| Barium carbonate | 74 |
| Carbon | 30 |

FRANCIS E. GARRIOTT.

REFERENCES CITED

The following references are of record in the file of this patent:

UNITED STATES PATENTS

| Number | Name | Date |
|---|---|---|
| 1,312,254 | Jones | Aug. 5, 1919 |
| 2,052,400 | Moritz | Aug. 25, 1936 |
| 2,238,392 | Matush | Apr. 15, 1941 |